United States Patent [19]

Spengler et al.

[11] 3,828,631

[45] Aug. 13, 1974

[54] CUTTING DIE AND PROCESS

[75] Inventors: Ernst Maximilian Spengler, Heusenstamm; Rolf Karl Stursberg, Haan, both of Germany.

[73] Assignee: Martin Miller Gesellschaft m.b.H., Vienna, Austria

[22] Filed: Jan. 10, 1973

[21] Appl. No.: 322,458

Related U.S. Application Data

[62] Division of Ser. No. 216,464, Jan. 10, 1972.

[30] Foreign Application Priority Data

Jan. 14, 1971 Germany............................ 2101543
Jan. 14, 1971 Germany............................ 7101204

[52] U.S. Cl.......................... 83/20, 83/176, 83/636, 83/697, 30/355
[51] Int. Cl............................................. B26d 1/04
[58] Field of Search .......... 83/13, 20, 21, 175, 176, 83/52, 56, 620, 636, 699, 688, 687, 925 CC, 697; 30/355

[56] References Cited
UNITED STATES PATENTS 1,098,579  6/1914  Lewis................................... 83/697
1,288,038  12/1918  Krook................................. 83/485 X
2,576,492  11/1951  Vogel................................. 30/355 X
3,593,611  7/1971  Sagehorn............................ 83/620 X Primary Examiner—J. M. Meister
Attorney, Agent, or Firm—Toren and McGeady

[57] ABSTRACT

The cutting die is made from strip steel and comprises a die blade having a cutting edge formed with sawteeth and chamfered surfaces extending along said cutting edge on opposite sides of said blade. To cut through a material which comprises a fabric having first filament portions extending in a predetermined direction and second filament portions extending transversely to said predetermined direction, said material is cut into at a plurality of discrete points which are spaced apart on an intended line of cut extending in said predetermined direction and said first filament portions which are disposed adjacent to said line of cut are pushed laterally away from said line of cut. At the same time, the cutting into said material is continued along said line of cut until said second filament portions extending across said line of cut have been severed.

1 Claim, 5 Drawing Figures

FIG. 1
FIG. 2
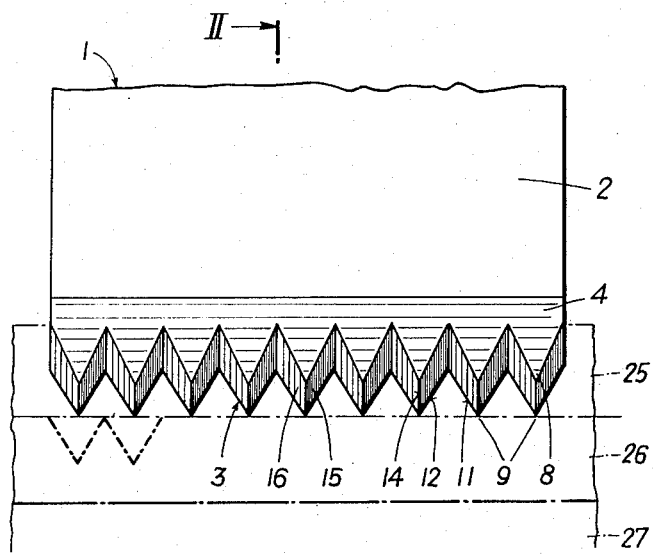
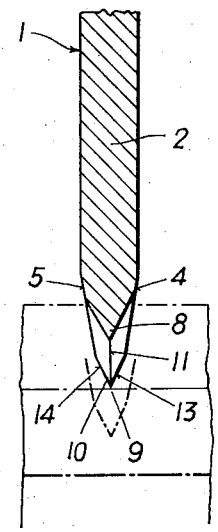

CUTTING DIE AND PROCESS

This is a division of application Ser. No. 216,464, filed Jan. 10, 1972.

This invention relates to a cutting die which is made from strip steel and consists of a blade provided with chamfered surfaces extending along the cutting edge of the die.

Such cutting dies made from strip steel are used mainly for cutting or severing textile fabrics, artificial leather reinforced with woven fabric and plastics material, and have a straight cutting edge. In addition to these cutting dies made from strip steel, cutting dies are known in which the cutting edges are zig-zag-shaped in order to fix the edges of textiles. Because the line of cut formed by these dies is longer than that obtained with cutting dies made from strip steel and having a straight cutting edge, a higher cutting pressure is required. A common aspect of both types of cutting dies made from strip steel resides in that each cutting operation results in the severing also of a plurality of threads which are parallel to the actual line of cut.

It is an object of the invention to provide a cutting die which is made from strip steel and which does not sever threads which extend in the woven fabric parallel to the cutting edge so that only the warp threads or only the filling threads are severed, and which can be operated under a lower cutting pressure than the known cutting dies made from strip steel.

This object is accomplished according to the invention in that the cutting edge is formed with sawteeth. As a result, the cutting tool first enters the material to be cut at discrete points and those threads of the woven fabric which extend substantially parallel to the line of cut are pushed aside before those threads of the woven fabric are severed which extend transversely to the line of cut. Those threads which have been pushed aside are not severed so that the resulting cut edges are neater than those obtained before. Besides, the cutting pressure required to operate the die having the novel cutting edge is much lower because the cutting edge enters the woven fabric to be severed at a multiplicity of almost pointlike cutting portions rather than along a continuous line extending on one level.

For this reason it is a special feature of the invention that the teeth have pointed ends and each tooth has a pyramid-shaped portion adjacent to its pointed end.

In a development of the invention, each tooth has adjacent to its pointed end a portion in the form of a quadrangular pyramid, two of the edges which extend toward the pointed end of the pyramid-shaped tooth portion constitute cutting edge portions which lie in a plane which extends in the longitudinal direction of the die blade and include an acute angle with each other, those edges which extend transversely to the cutting edge portions terminate at the chamfered surfaces of the die blade and include an angle which is larger than the angle included by the two chamfered surfaces, and the tooth side faces which extend from the pointed ends of adjacent teeth terminate and adjoin adjacent to the chamfered surfaces farther from the pointed ends than the edges of said pyramid-shaped portion.

It is also a feature of the invention that each tooth has adjacent to its pointed end a portion in the form of a triangular pyramid.

The invention will now be described more fully with reference to the drawing, which shows two illustrative embodiments.

FIG. 1 is a side elevation of a cutting die according to the invention. This cutting die is made from strip steel, and each of its teeth has adjacent to its pointed end a portion in the form of a quadrangular pyramid.

FIG. 2 is a vertical sectional view taken on line II—II in FIG. 1.

Figure 3:
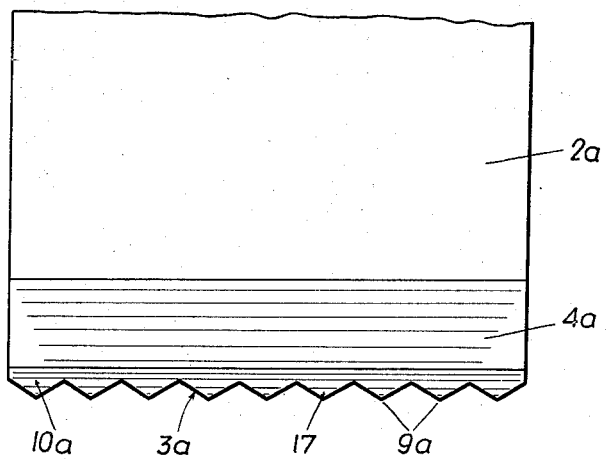
FIG. 3 is an elevation showing another embodiment in which each tooth has adjacent to its pointed end a portion in the form of a triangular pyramid.

The cutting die 1 which is shown in FIG. 1 is made from strip steel and comprises a die blade 2 having chamfered surfaces 4 and 5 and a cutting edge 3 formed with sawteeth. Teeth 8 are provided adjacent to the chamfered surfaces 4 and 5 and each of said teeth has a pointed end 9 and adjacent to said pointed end 9 a tooth portion 10 in the form of a quadrangular pyramid. Edge portions 11 and 12 extending from the pointed ends 9 serve as cutting edge portions and are aligned with the pointed ends 9 to provide a straight line of cut, which extends in the longitudinal direction of the die blade.

The other two edges 13 and 14 of the tooth portion 10 having the form of a quadrangular pyramid extend transversely to the cutting edge portions from the pointed ends 9 to the chamfered surfaces 4 and 5 and terminate at the latter. As is particularly apparent from FIG. 2, the angle which is included by the two edges 13 and 14 is larger than the angle which is included by the chamfered surfaces 4 and 5.

The teeth 8 have side faces 15 and 16, and the chamfered surfaces 4 and 5 on the opposite sides of the tooth blade 2 also form tooth side faces. The side faces 15 and 16 extend farther away from the pointed ends 9 than the cutting edge portions 11 and 12 and the edges 13 and 14 which are transverse to the edges 11 and 12.

Figure 4:
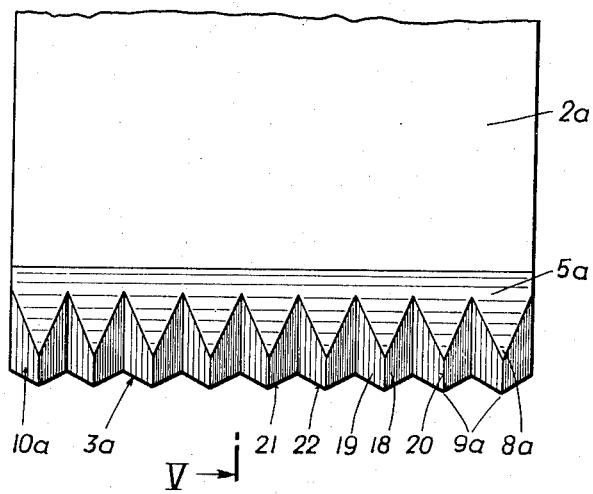
FIG. 4 is another elevation showing the embodiment of FIG. 3.
Figure 5:
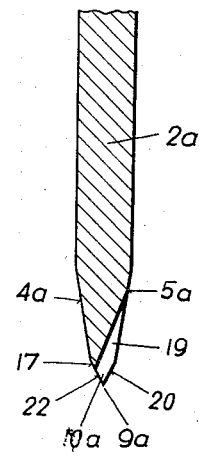
FIG. 5 is a sectional view taken on line V—V in FIG. 4.

FIGS. 3 to 5 show another embodiment, in which the cutting edge 3a is provided with teeth 8a which have pointed ends 9a and adjacent to said pointed ends have tooth portions 10a in the form of a triangular pyramid. A side face 17 of the pyramid-shaped tooth portion 10a directly adjoins a chamfered surface 4a of the die blade 2a. The other two side faces 18 and 19 of each tooth have a common edge 20 and terminate on one side at the side face 17 which is transverse to the longitudinal direction of the die blade 2a, and on the other side at a chamfered surface 5a on that side of the die blade 2a which is opposite to the surface 4a. Edges 21 and 22 defined jointly by the side faces 17 and 18 and 19 extend from the pointed ends 9a at an angle to the longitudinal direction of the die blade 2a and serve as cutting edge portions.

FIGS. 1 and 2 show the cutting die 1 which is made from strip steel and material 25 to be cut, which material rests on a base 26, which is carried by a support 27. When severing the material 25 to be cut, the teeth 8 of the cutting die 1 made from strip steel penetrate to some extent into the base 26, which may consist of hard rubber, synthetic plastic materials or similar materials. Specifically, the base may consist of a material which is softer than the material to be cut because the cutting die 1 according to the invention, which is made from strip steel, exerts only a relatively slight cutting pressure in a vertical direction on the material to be cut and on the base. Owing to the horizontally directed component of pressure, satisfactory cutting operations may be performed also on plastics materials, such as styropor, hard synthetic foams, etc. This has not always been possible before owing to the difficulties involved in the initial penetration of the cutting die into the material to be cut.

We claim:

1. A process of cutting a material which comprises a fabric having first filament portions extending in a predetermined direction and second filament portions extending transversely to the predetermined direction of the first filament portions, cutting the material in a line extending in the predetermined direction of the first filament portions by first inserting a continuous cutting member into the material and making a plurality of spaced punctiformed openings aligned in the predetermined direction of the first filament portions, continuing the passage of the cutting member through the punctiform openings and directing the first filaments adjacent the cutting member laterally away from the line of the punctiform openings and gradually increasing the width of the punctiform openings on both sides in the predetermined direction of the first filament portions, first directing the first filament portions laterally along oppositely directed first planar surfaces each forming an acute angle with a plane extending perpendicularly to the material along the cutting line, continuing the lateral displacement of the first filaments along oppositely directed second planar surfaces each forming a continuation of one of the first planar surfaces and also forming an acute angle with the plane extending perpendicularly to the material along the cutting line and with the second planar surfaces forming a smaller acute angle with the prependicular plane than the first planar surfaces, and continuing the passage of the second planar surfaces through the material and widening the individual openings until adjacent openings join to form one continuous opening and thereby cutting the material without severing the first filaments.

* * * * *